United States Patent [19]

Short

[11] Patent Number: 4,911,417
[45] Date of Patent: Mar. 27, 1990

[54] TAPERED BUSHING MEMBER

[76] Inventor: Bruce A. Short, Waimuku RD 3, Auckland, New Zealand

[21] Appl. No.: 301,143

[22] Filed: Jan. 25, 1989

[51] Int. Cl.$^4$ .................. F16F 7/00; B60G 11/26; F16D 1/00; B25G 3/20
[52] U.S. Cl. .................. 267/256; 267/270; 267/141.7; 280/711; 403/227; 403/368
[58] Field of Search .............. 267/270, 293, 30, 31, 267/141.2, 141.3, 141.7, 256, 257, 140.2, 269; 280/661, 711-713, 716, 717; 403/224, 225, 227, 228, 368, 372

[56] References Cited

U.S. PATENT DOCUMENTS

| | | | |
|---|---|---|---|
| 1,585,532 | 5/1926 | Cole et al. | 267/270 X |
| 2,236,686 | 4/1941 | Jackson | 267/30 X |
| 3,434,707 | 3/1969 | Raidel | 267/270 X |
| 3,866,938 | 2/1975 | Boyd et al. | 280/661 |
| 4,166,640 | 9/1979 | Van Denberg | 267/270 X |
| 4,762,310 | 8/1988 | Krajewski et al. | 267/270 X |

Primary Examiner—Robert J. Oberleitner
Attorney, Agent, or Firm—Young & Thompson

[57] ABSTRACT

A bush is disclosed particularly for flexibly mounting an axle assembly on the chassis of a vehicle. An elastic bush is inserted in a sleeve mounted on the axle assembly. The elastic bush as a tapered bore. A pin with a tapered outer face is inserted in the tapered bore and expands the elastic bush into frictional engagement with the sleeve. The sleeve and elastic bush are located between mounting plates mounted on the chassis. The pin is fixed to at least one of the mounting plates by means of a bolt which passes through a hole in the mounting plate so that any movement between the axle assembly and the chassis is taken up by flexure of the elastic bush. The axis of the bolt is offset from the axis of the tapered face of the pin so that the pin can be brought into alignment with the hole in the mounting plate by rotating the pin in the bore of the elastic bush.

6 Claims, 4 Drawing Sheets

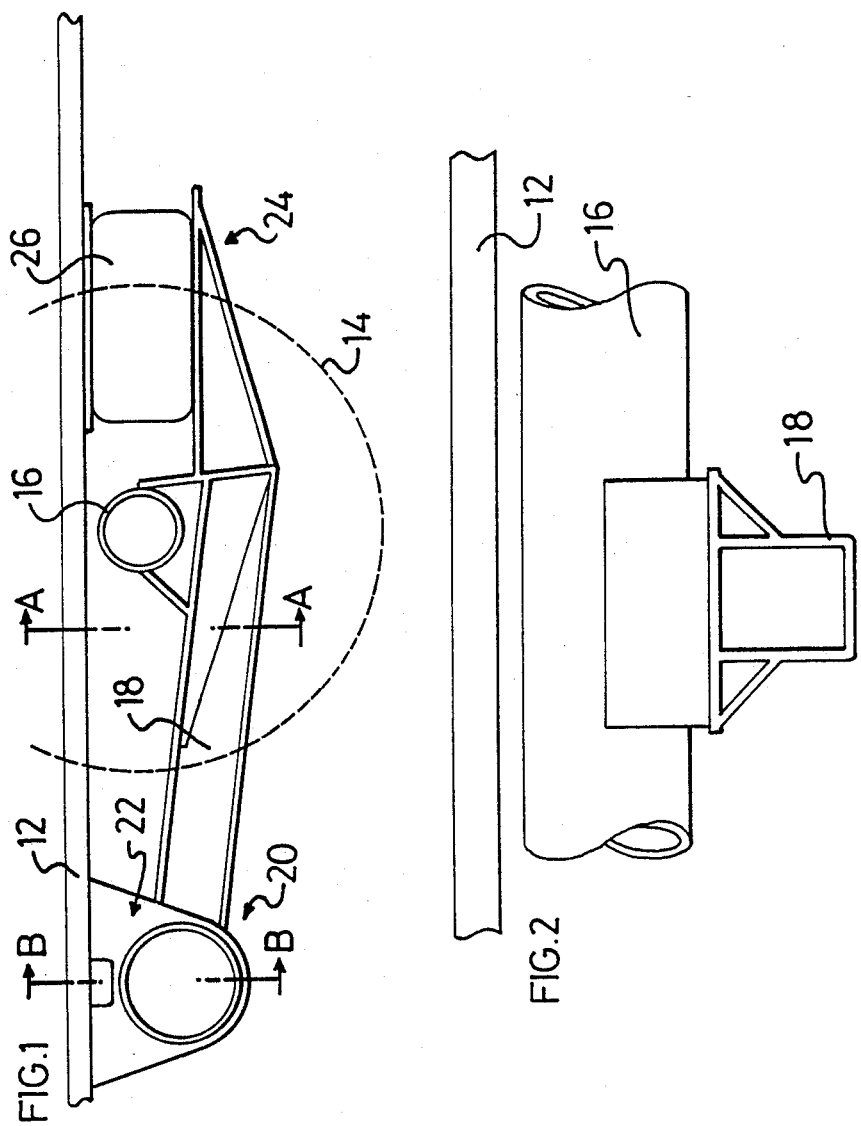

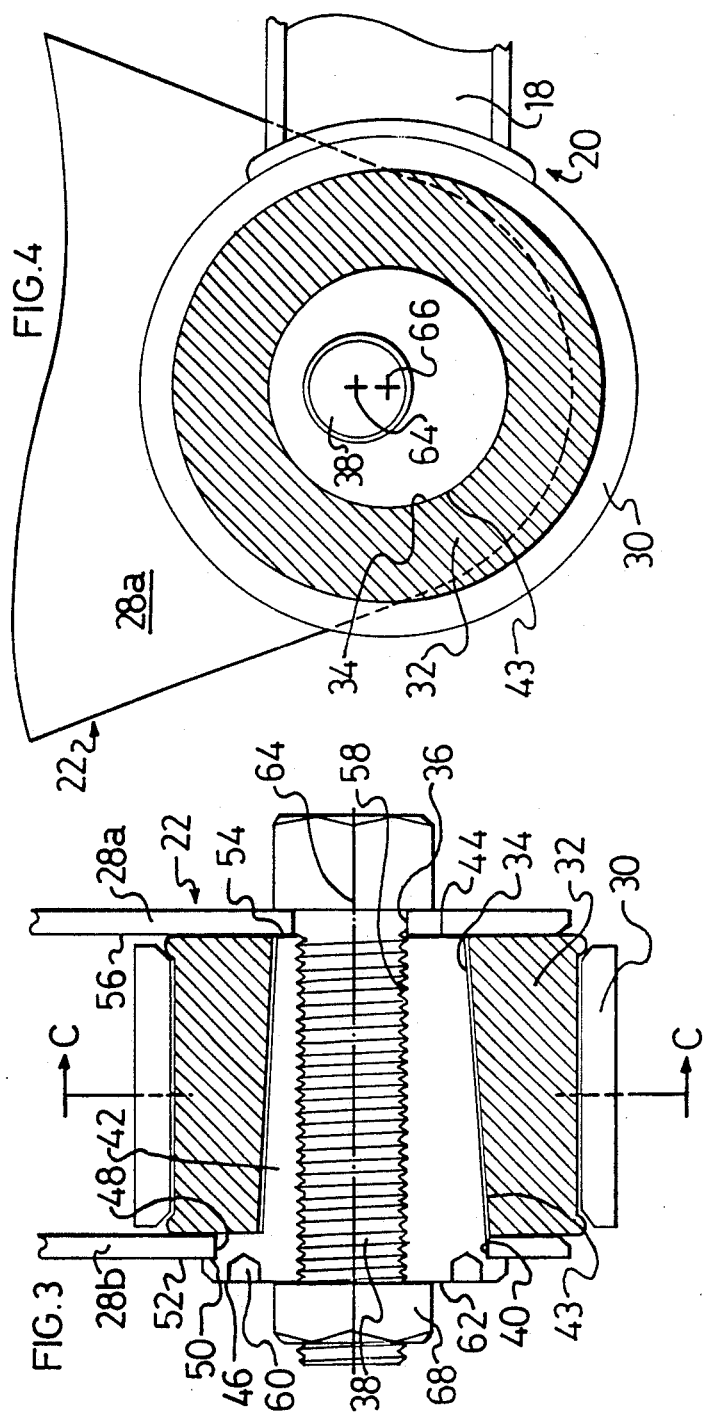

4,911,417

TAPERED BUSHING MEMBER

FIELD OF THE INVENTION

This invention relates to an axle mounting particularly but not necessarily exclusively for heavy road vehicles such as trailers.

BACKGROUND OF THE INVENTION

Conventionally, a common arrangement for mounting an axle of many heavy trailers provides that the chassis or frame of the vehicle is furnished with brackets on both sides of the trailer on each of which an axle-carrying arm is mounted. The arms pivot about a common horizontal axis parallel to the axle. A spring system is mounted between each arm (or each end of the axle) and the chassis. The spring system may comprise a mechanical spring or an air cushion or piston-and-cylinder arrangement. In any case the arrangement allows the axle to ride up and down non-reactively relative to the chassis pivoting with the arms about the common axis. Because as a matter of practicality one end of the axle will often ride to a higher or lower position relative to the chassis than the other end, it is necessary to allow for a degree of flexibility in the joints between the axle and the arms and/or between the arms and the mounting brackets on the chassis. Commonly this flexibility is achieved by providing a rubber bush between the components at the joints in question. Conventionally the rubber bush comprises inner and outer cylindrical metal sleeves coaxially located with an annular body of rubber in the space between the sleeves. The bush is mounted on the bracket by means of a bolt which passes through the inner sleeve and clamps the bush to the bracket. The axle arm is fixed to the outer sleeve in some suitable manner, as for example by means of a caliper-shaped clamp which passes around the outer sleeve and is bolted to the end of the arm.

Conventionally, the bushes are manufactured by press-fitting the rubber body to the sleeves. Because this requires special machinery known such bushes are expensive and it is one object of the invention to provide a bush in which the press-fitting operation is eliminated.

Proposals have also been made to provide a bush for flexibly joining two components together in which the rubber body is not pressed into inner and outer sleeves. Instead the bush can be inserted in a socket formed in one of the components and expanded into frictional contact with the socket when the other component is mounted. One proposed means of achieving this expansion is to provide the rubber bush with a tapered bore and to provide a complementarily tapered bolt or pin for mounting the other component, the bolt being inserted in the bore and forcing the rubber body radially outwardly during the mounting process. Another means of achieving the expansion which has been suggested is to squeeze the rubber body inwardly in the axial direction means of washers located at each end thereof, the washers being pulled towards one another when a nut mounted on the bolt is tightened up. Examples of bushes of these kinds (non of which are intended for suspensions comprising an axle carried on a rigid trailing arm) are disclosed in U.S. Pat. Nos. #3,434,707, #242,950, #2,346,574, #3,989,126 and #3,493,222.

It is a further problem with suspensions, particular of heavy vehicles, that it is laborious and time consuming to mount the axle-carrying arm on the frame due to misalignment between the bore of the bush and the holes in the frame which receive the bolt which is inserted in the bore. This problem may arise for various reasons the most common being distortion of the frame of the vehicle as a result of an accident. The above mentioned U.S. Pat. No. #3,434,707 discloses a system for bringing the bore of the bush into alignment with the holes in the frame. This system comprises essentially the provision of additional bushes which are inserted in the holes in the frame. These additional bushes are provided with holes for the bolt which holes are bored off centre so that rotation of the bushes will bring the holes therein into line with the bore of the rubber rubber.

In the applicant's view the arrangement disclosed in U.S. Pat. No. #3,434,707 suffers from several disadvantages. First, it is complex and therefore expensive. Second, there will inevitably be rapid wear between the aforementioned washers and the nuts which bear on the them. Related to this is the fact that the bore of the rubber bush is provided with a metal sleeve and the bush is free to rotate about the bolt which passes through the bore. Some of the dampening effect of the rubber bush is thus lost. Third, the provision of two separate bushes with off centre holes appears likely to complicate the process of lining up the bore of the bush with the off centre holes. trailer provided with a suspension comprising an axle mounted on a rigid trailing arm.

OBJECT OF THE INVENTION

It is an object of the invention to provide a bush which is simple to make and fit and in which all movement between the two components which are joined together by the bush is taken up by the rubber body of the bush; or at least to offer the public a bush of an alternative design to those heretofore available.

SUMMARY OF THE INVENTION

According to the invention there is provided a bush for flexibly mounting a first component of an apparatus such as a vehicle on a second component thereof, the bush comprising a rigid inner member mountable on the first component and an outer member of rubber or other suitable elastically deformable material mountable in a socket in the second component, the outer member comprising a tapered bore and the inner member comprising an outer face which is tapered complementally to the tapered bore so that when the inner member is forced into in the tapered bore the outer member can be deformed by the outer face of the inner member into frictional engagement with the socket, the inner member being rotatable with respect to the first component prior to being fixed in position thereon about an axis which is offset from an axis of symmetry of the outer face of the inner member.

In one form of the invention means for mounting the inner member on the first component may comprise a bore (which may be screw threaded) formed in the inner member for receiving a fastener which passes through an aperture in the first component. Alternatively the first component may comprise a projection such as a screw threaded spigot which passes through the aperture in the first component.

The axis of the bore or projection may be parallel to but offset from the axis of symmetry of the outer face of the inner member.

According to one aspect of the invention the inner member has an end face which is normal to the axis of symmetry of the outer face, the end face being pulled up in use into abutment with an inner face of the first component.

According to another aspect of the invention, the outer member is located between two mounting members of which the first component is comprised and the inner member has an annular face also normal to the axis of symmetry and facing in the same direction as the end face, the end face being pulled up in use fastener into abutment with an inner face of one said mounting member and the annular face being pulled up in use into abutment with an outer face of the other said mounting member.

In one form of the invention the one said mounting member comprises said aperture and the other said mounting member comprises a passage which is in axial alignment with the aperture, a right circular cylindrical face being formed in the inner member and located adjacent the annular face, the right circular cylindrical face being coaxial with and being a close fit in said passage.

One of the components may be a trailing arm of an axle assembly for a vehicle. In one aspect the axis of symmetry of the outer face is nominally parallel to an axis of rotation of a wheel mounted on the axle assembly. Alternatively the axis of symmetry of the tapered face is disposed at an angle to the axis of rotation of the wheel.

BRIEF DESCRIPTION OF THE DRAWINGS

The invention is further discussed with reference to the accompanying drawings in which various embodiments are illustrated by way of example only and in which FIG. 1 is a side view of a trailer axle mounted on a trailing arm which is itself mounted on the chassis of the trailer;

FIG. 2 is a cross sectional view on Arrows A—A in FIG. 1;

FIG. 3 is a cross sectional view on Arrows B—B in FIG. 1;

FIG. 4 is a cross sectional view on Arrows C—C in FIG. 3;

DETAILED DESCRIPTION OF THE ILLUSTRATED EMBODIMENTS

Figure 5:
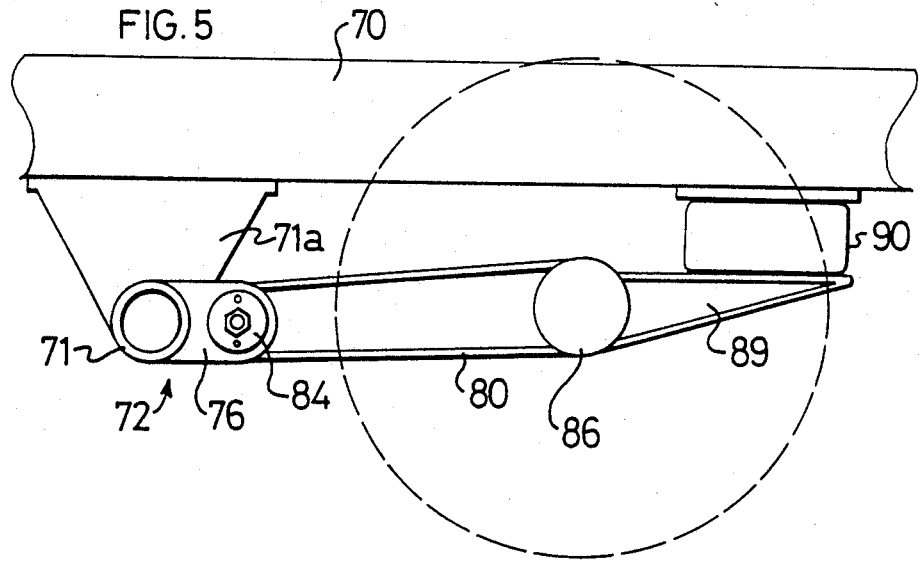
FIG. 5 is a schematic side view similar to FIG. 1 of a modified axle and trailing arm assembly.

In the drawings there is shown part of a trailer comprising a chassis 12. The trailer is mounted on one or more sets of road wheels one of which is indicated at 14 and is carried on an axle 16. The axle is mounted on trailing arms 18. It is an advantage of the invention that the axle can be welded to the trailing arm without fear that excessive torsional stresses will be applied to cause the components to fail due to the rigidity of the welded joint. There are two trailing arms, disposed one adjacent each end of the axle. Each trailing arm is pivotably mounted at one end 20 on a bracket 22 welded or otherwise fixed to the chassis 12. The trailing arm and bracket at one end only of the axle is shown in the drawings as they are identical to those at the other end. At the end 24 of the trailing arm opposite the end 20 an air bag 26 is mounted between the trailing arm 18 and the chassis 12. This air bag is of conventional type for use in vehicle suspensions and it will not be further described. It will be clear however that the axle is arranged to ride up-and-down, pivoting with the trailing arm about its mounting on the bracket 22. As shown in FIG. 3, the bracket 22 comprises a pair of plates 28a, 28b of approximately triangular shape, the plates being spaced apart in the direction transverse to the fore-and-aft line of the trailer. A stout cylindrical sleeve 30, welded to the end 20 of the trailing arm and forming part thereof, is located between the plates 28a, 28b. Prior to positioning the sleeve 30 between the plates a bush 32 of stiff rubber or high quality plastics elastically deformable plastics material such as polyurethane of annular configuration is inserted in the sleeve, being an easy sliding fit therein. The bush 32 has a coaxial bore 34 which is tapered from one end to the other. One of the plates 28a has a hole 36 bored therein which is nominally in alignment with the axis of the sleeve 30 and through which passes a bolt 38. The other plate 28b also has a hole 40 bored therein in alignment with the hole 36. The hole 40 however is of considerably larger diameter than the hole 36.

A rigid steel insert 42 is mounted in the bore 34 of the bush 32. The insert 42 has an outer face 43 which is tapered parallel to the bore 34, one end 44 of the insert being of smaller diameter than the other end 46. The end 44 can pass through the large diameter hole 40 in the plate 28b The end 46, however, is provided with a land 48 which is a neat clearance fit in the hole 40 and is bounded by a shoulder 50 which is located adjacent the outer face 52 of the plate 28b when the face 54 at the end 44 of the insert is in abutment with the inner face 56 of the plate 28a. The insert is provided with a screw-threaded bore 58 which enables the insert to be screwed on the bolt 38. Recesses 60 are formed in the face 62 of the insert. These recesses accommodate a tool for turning the insert on the bolt. The axis 66 of the tapered face 43 and the land 48.

After the sleeve 30 at the end of the trailing arm has been positioned between the plates 28a, 28b with the bush 32 aligned as closely as possible with the holes 36, 40 the bolt 38 is inserted through the hole 36 and projects through the bore 34 of the bush and the hole 40. The insert 42 is then screwed small-diameter end first onto the bolt and by this means is drawn through the hole 40 and into the bore 34. As it penetrates deeper into the bore 34 the insert expands the bush outwardly into frictional contact with the sleeve 30. Eventually the face 54 of the insert is pulled hard against the face 56 of the plate 28a. The insert is then locked in position by means of the lock nut 68.

It is common to find that the bore 34 of the bush is misaligned with the holes 28a, 28b when the axle is in its correct position. This may occur as a result of engineering inaccuracies during manufacture or after the vehicle has been involved in an accident. This misalignment, provided it is not too severe, may be taken up by rotating the insert 42. For example, if axis of the screw-threaded bore 58 is off-set from the axis of the tapered face 43 by, say, 5 mm a misalignment of up to 10 mm can be taken up. This feature is also useful to move one end or the other of the axle in a fore-and-aft direction to adjust the tracking of the vehicle.

In the example illustrated the overall diameter of the rubber bush is about 150 mm which is considerably larger than the overall diameter of conventional bushes. The other dimensions of this example may be scaled from FIGS. 3 and 4 which are drawn to scale.

In an alternative construction a modified insert (not shown in the drawings) is substantially similar to the insert 42 except that it has no bore 58. Instead it is provided with a threaded spigot which is formed integrally with the modified insert and projects from the small-diameter end face thereof, its axis lying on the same axis as that on which the bore 58 in the insert 42 lies. The modified insert is pulled up to the plate 28a by a nut mounted on the spigot.

It is desirable to reduce unwanted movement of the components of a suspension to a minimum to reduce wear. After the insert has been tightened up in place by the bolt 38 it may be further secured against such movement by tack welding the shoulder 50 to the plate 28b. The size of the insert renders this an easy and practicable step. It may be mentioned that the size of the components of the present invention materially contributes to their service life.

Figure 6:
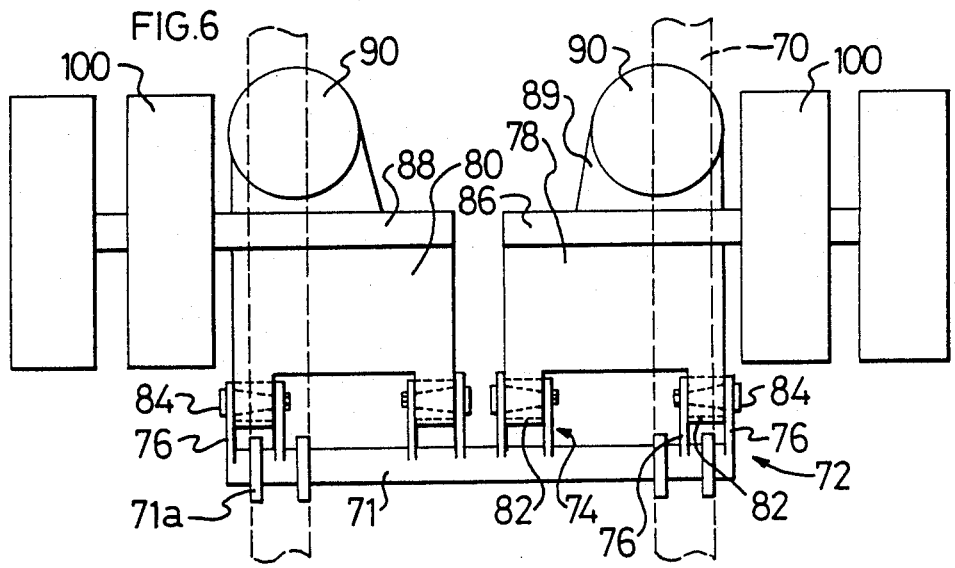
FIG. 6 is a schematic view from above of the assembly shown in FIG. 5.

In FIGS. 5 and 6 a vehicle is provided with a chassis 70 across which is mounted a pipe 71 carried on plates 71a. Adjacent each end of the pipe 71 are mounted two pairs of spaced brackets 72, 74 each comprising two spaced plates 76. Right- and left-hand trailing arms 78, 80 are provided. Apart from being handed, the trailing arms are mutually identical and only one will be described. At its forward end the trailing arm 78 is provided with a pair of spaced lugs 82 each incorporating a socket in which a rubber bush substantially identical to bush 32 is located. The lugs 82 are spaced so as to fit between the plates 76 of the brackets 72, 74 on the right or left hand-side of the vehicle. A tapered insert 84 substantially identical to the insert 42 is mounted between the plates 72 on each bracket projecting into the bore of the bush in each case in in the same way as described with respect to the insert 42 and bush 32. The inserts are mounted in the lugs 82 of each bracket with there narrow ends facing towards each other and can be independently adjusted as already described.

Towards its rear end the trailing arm 78 carries an axle 86 which is independent of the axle 88 on the trailing arm 80. Also at its rear end the trailing arm 78 is provided with a bracket 89 which forms a seat for an air bag 90 in the same manner as already described for the trailing arm 18. Wheels 100 are mounted on the axles 86, 88.

The arrangement shown in FIGS. 5 and 6 provides an independent suspension for the right- and left-hand wheels of the vehicle while still incorporating the bushes of the invention. Moreover, because the inserts 84 on each bracket 72, 74 can be independently adjusted the arrangement provides a manner of adjusting the toe-in of the wheels on each side. Sufficient space may be left between the trailing arms to allow a transmission shaft to pass therebetween in the case of a vehicle having a driven set of wheels behind the wheels shown.

Figure 7:
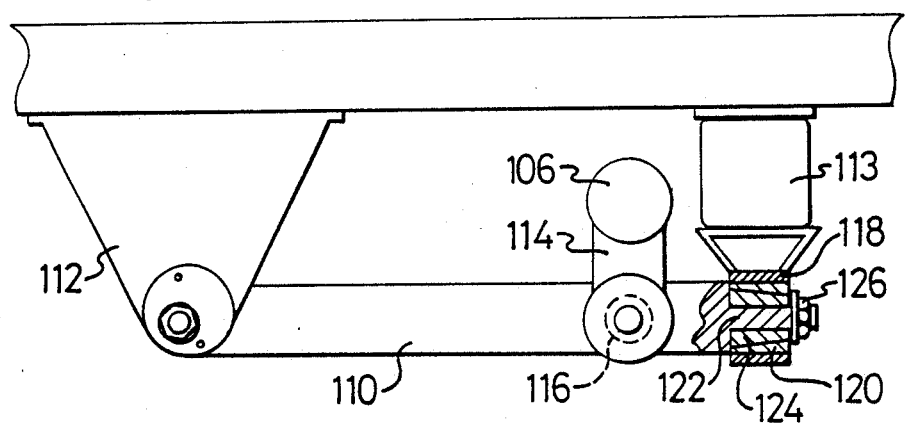
FIG. 7 is a schematic side view similar to FIGS. 1 and 5 of yet another modified axle and trailing arm assembly.
Figure 8:
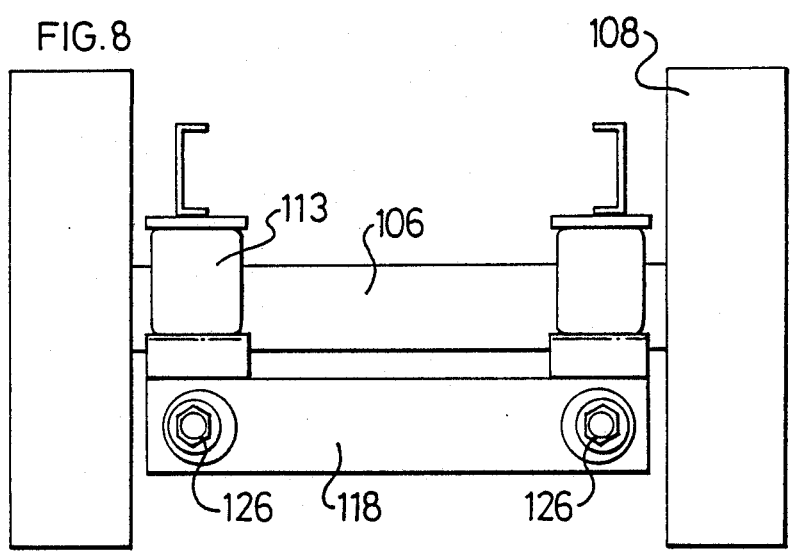
FIG. 8 is a schematic view from the rear of the assembly shown in FIG. 7.

FIGS. 7 and 8 show a further arrangement incorporating the bushes of the invention. Here a single axle 106 is provided carrying the right-and left-hand wheels 108. Right- and left-hand trailing arms 110 are provided, mounted on brackets 112 by means of the bushes of the invention and supported on air bags 113 as already described with respect to FIGS. 1 to 4. Each trailing arm is provided with a socket in which is inserted a rubber bush with a tapered bore. The axle 106 is provided with two pairs of downwardly depending plates 114. Each pair of plates embraces the trailing arm. Each trailing arm is provided with a socket in which is inserted a rubber bush with a tapered bore. A tapered insert 116 is mounted between the plates 114, being received in the tapered bore of the bush in the same manner as described with reference to FIGS. 1 to 4 except that the tapered insert 116 has a concentric screw-threaded bore by means of which it is fixed to the plates 114. It is not necessary to provide the insert with an off set bore as preset height adjustment of the axle with respect to the trailing arms is not in the present case called for.

A further refinement of the arrangement shown in FIGS. 7 and 8 is the provision of a transverse tie rod 118 joining the two trailing arms. The tie rod has sockets at each end in each of which rubber bushes 120 having tapered bores are inserted. Each trailing arm is provided at its end with a threaded spigot 122 over which is mounted a rigid tapered insert 124 having an off centre bore. The spigot 122 passes through the off centre bore and a nut and washer 126 mounted on the end of the spigot pulls the bush 120 up over the insert. Prior rotation of the insert about the spigot adjusts the effective betweencentre length of the tie rod.

In the present case the tie rod is provided with seats for the air bags and by this means the trailing arms are supported by the air bags.

There is no intention that the scope of the invention as defined in the claims be limited by details of the examples described and illustrated beyond what is necessary to distinguish the invention from the prior art. It will be appreciated, for example, that the present invention could be applied to leading arm suspension systems rather than a trailing arm system as described above. Similarly, the present invention could be applied to a variety of other apparatus having components requiring articulation or adjustment. In particular the invention could be applied to other vehicles such as motor cars. Improvements may be made without departing from the spirit and scope of the invention.

I claim:

1. A bush for flexibly securing a swinging arm of a suspension system to a vehicle, said suspension system including spaced first and second plates for securing said bush in a housing located between said plates, said bush comprising:
   (a) a rigid inner member having an end face which in use is parallel to and in abutment with an inner face of said first plate; and an outer face comprising a tapered portion which tapers inwardly from a position adjacent said second plate to a position adjacent said first plate;
   (b) fastening means on said rigid inner member for pulling said end face into tight frictional engagement with said inner face of said first plate; and
   (c) an outer member of elastically deformable material comprising a bore which is tapered complementally to said tapered portion of said outer face so that when said inner member is inserted in said bore and said end face is pulled into abutment with said inner face of said first plate the bush is deformed by said tapered portion into frictional engagement with said housing.

2. A bush as claimed in claim 1, wherein said fastening means has an axis about which prior to being fixed in position said inner member can be rotated and said outer face has an axis which is offset from said axis of said fastening means.

3. A bush as claimed in claim 2, wherein said inner member comprises a shoulder projecting outwardly from said outer face of said inner member and in use is in abutment with an outer face of said second plate.

4. A bush as claimed in claim 4, wherein said fastening means comprises a screw threaded bore, formed in said inner member for receiving a complementally screw threaded fastener which passes through an aperture in said first plate for fastening said inner member to said first plate.

5. A bush as claimed in claim 4, wherein said outer face of said inner member is provided with a land located between said shoulder and said tapered portion and being coaxial with said screw threaded bore said second plate being provided with an aperture in axial alignment with said aperture in said first plate, said land being a neat fit in said aperture in said second plate.

6. A bush as claimed in claim 1, wherein said inner member comprises a shoulder projecting outwardly from said outer face of said inner member and in use is in abutment with an outer face of said second plate.

* * * * *